US008977724B2

(12) United States Patent
Patnaik et al.

(10) Patent No.: US 8,977,724 B2
(45) Date of Patent: Mar. 10, 2015

(54) METHOD AND SYSTEM FOR AUTOMATED OPERATING SYSTEM IMAGE LOADING

(75) Inventors: Yashodhara M. Patnaik, Somers, NY (US); Kumar Ravi, Austin, TX (US); Radhakrishnan Sethuraman, Austin, TX (US); Manuel Silveyra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/750,951

(22) Filed: Mar. 31, 2010

(65) Prior Publication Data

US 2011/0246755 A1 Oct. 6, 2011

(51) Int. Cl.
*G06F 15/177* (2006.01)
*G06F 9/44* (2006.01)
*G06F 15/173* (2006.01)
*G06F 9/445* (2006.01)

(52) U.S. Cl.
CPC .................................. *G06F 9/4416* (2013.01)
USPC ................ 709/220; 709/223; 717/174; 713/1

(58) Field of Classification Search
CPC ....... G06F 9/4416; G06F 8/63; G06F 9/4406; G06F 21/6218; G06F 9/5077
USPC .......................... 713/1; 717/174; 709/220, 223
See application file for complete search history.

(56) References Cited

U.S. PATENT DOCUMENTS

| 6,938,250 | B2 * | 8/2005 | Cohen et al. ................... 717/178 |
| 7,260,602 | B2 | 8/2007 | Osborne et al. |
| 7,630,877 | B2 * | 12/2009 | Brown et al. .................... 703/21 |
| 2002/0017977 | A1 | 2/2002 | Wall |
| 2003/0023839 | A1 * | 1/2003 | Burkhardt et al. ................ 713/1 |
| 2003/0110011 | A1 | 6/2003 | Kyotoku |
| 2005/0097549 | A1 | 5/2005 | Chu et al. |
| 2005/0144620 | A1 | 6/2005 | Hada et al. |
| 2006/0005181 | A1 * | 1/2006 | Fellenstein et al. ........... 717/174 |
| 2006/0142026 | A1 * | 6/2006 | Al-Baghdadi ............. 455/456.3 |
| 2008/0120350 | A1 * | 5/2008 | Grabowski et al. ........... 707/202 |
| 2010/0030878 | A1 * | 2/2010 | Grabowski et al. ........... 709/222 |
| 2011/0258143 | A1 * | 10/2011 | Hilkemeyer et al. ......... 705/400 |

FOREIGN PATENT DOCUMENTS

JP 2005209195 8/2005

\* cited by examiner

*Primary Examiner* — David Lazaro
*Assistant Examiner* — Vitali Korobov
(74) *Attorney, Agent, or Firm* — Lieberman & Brandsdorfer, LLC

(57) ABSTRACT

A method, system, and article for dynamic management of two or more operating system images for at least two client machines operating in a computer system sub-network. Different physical areas of the sub-network support separate image of the operating system images. As the client machines may be individually subject to movement within the sub-network, an appropriate operating system image is dynamically selected and uploaded to one or more of the individual client machines based upon the physical location thereof.

18 Claims, 4 Drawing Sheets

METHOD AND SYSTEM FOR AUTOMATED OPERATING SYSTEM IMAGE LOADING

BACKGROUND OF THE INVENTION

1. Technical Field

This invention relates to management of an operating system image assigned to a client machine in a network. More specifically, the invention relates to dynamic management of an assignment of the operating system image to the client machine.

2. Description of the Prior Art

An operating system image, herein after referred to as image, is a representation of a computer program and its related data such as the kernel, file systems, libraries, and programs of the computer at a given point in time. Servers deploy the images to client machines so that the client machines have the same base software. The image can be installed on a client machine that has no software, or it can replace existing software on a client machine.

In computer networking, a media access control address, hereinafter MAC address, is a unique identifier assigned to a network adapter or a network interface card (NIC). More specifically, the MAC address is a hardware address associated with a network adapter and is used to identify an adapter on a local area network (LAN). It is known in the art to assign an operating system image to a client machine based upon the MAC address of the network adapter. However, the prior art does not address the aspect of portability of a client machine and adjustment of the operating system image absent user interaction and based upon a changed physical location of the client machine. This omitted aspect of the prior art prohibits dynamic adjustment of the role of the client machine subject to the portability thereof. Accordingly, there is a need to employ a tool to dynamically modify the functionality of one or more client machines subject to the physical location of the machine(s).

SUMMARY OF THE INVENTION

This invention comprises a method, system, and article for management of an operating system image of a client machine.

In one aspect, a computer system is provided with a server in communication with data storage. Two or more client machines are provided in the system in communication with the server, with at least two operating system images retained in the data storage. A discovery tool is provided to identify the location of one or more of the client machines in the system. Similarly, a manager, which is in communication with the discovery tool, is provided to dynamically relate the identified location of the client machine with the function of the identified client machine. More specifically, the manager communicates with the server to upload one of the operating system images from the data storage to the identified client machine. The selection of the operating system image is based upon the identified location of the client machine.

In another aspect of the invention, a method is provided for managing a client machine interface. At least two client machines are provided in communication with a server and data storage, and at least two operating system images are retained in the data storage for selection. A location of at least one of the client machines is identified. This identified location of the client machines is dynamically related with a function of the identified machine. More specifically, this dynamic relation includes communicating with the server for selecting and uploading from data storage at least one of the operating system images to the identified client machine. The selected operating system image is based upon the identified location of the client machine.

In yet another aspect of the invention, an article is provided with a server in communication with data storage, and at least two client machines in communication with the server. Additionally, a computer-readable storage medium is provided with computer program instructions configured to manage a client machine interface. The instructions including: instructions to retain at least two operating system images in the data storage for selection, instructions to identify the location of at least one of the client machines, and instructions to dynamically relate the identified location of at least one of the client machines with a function of the machine and to communicate with the server to select and upload at least one of the operating system images from data storage to the identified client machine.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

Figure 1:
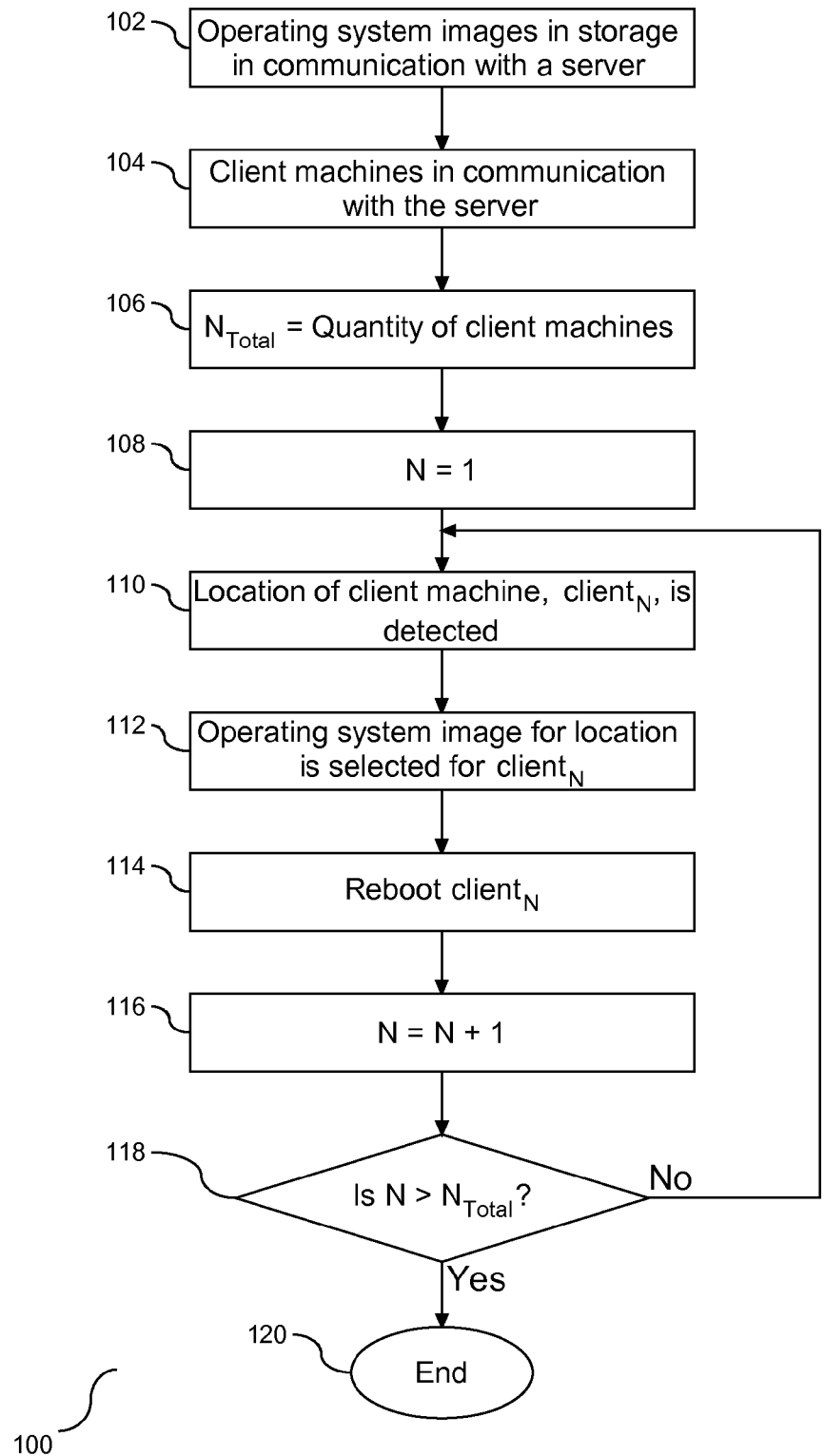
FIG. 1 is a flow diagram illustrating the components and the process of uploading an operating system image with respect to two or more client machines operating in a sub-network.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as tools, modules, and/or managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A method and system are provided to dynamically upload an operating system image of a client machine based upon the physical transport of the client machine within a sub-network. More specifically, a different operating system image may be uploaded to one or more client machines based upon the portability of the machine. A discovery tool is employed to gather data pertaining to the physical location of one or more of the client machines, and a manager in communication with the discovery tool dynamically uploads an operating system image to at least one of the client machines based upon a changed location of the machine that warrants a different operating system image. The dynamic uploading is based upon an identified physical location of the client machine. Accordingly, the discovery tool together with the manager eliminates the need to extend functionality of a basic pre-boot execution environment by enabling dynamic upload of an operating system image based upon a physical location of the client machine.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

The quantity of client machines operating in a sub-network, as well as the quantity of operating system images retained in data storage, vary among different operating environments. A sub-network is a group of networked computers and devices that have a common Internet Protocol (IP) address routing prefix. Each operating environment is different and may retain a different number of operating system images that may function within the environment. In one embodiment, the quantity of operating system images available in data storage are sufficient to support all of the intended functionalities in a given sub-network to ensure that each of the client machines, each at it's own location, is operating with an operating system image in compliance with the detected location of the machine.

FIG. 1 is a flow diagram (100) illustrating the components and the process of uploading an operating system image with respect to two or more client machines operating in a sub-network. Two or more operating system images are stored in a data center in communication with a server (102). Similarly, two or more client machines, each in communication with the server, are designated to operate within the sub-network (104). At least one of the client machines is capable of being moved from a first physical location in the sub-network to a second physical location in the sub-network. In one embodiment, at least one of the client machines is a portable computing device, including but not limited to, a laptop computer, a portable digital assistant, etc. Similarly, in one embodiment the first and second physical locations have different operating system images assigned thereto. The variable $N_{Total}$ is assigned to the quantity of client machines designated to operate in the sub-network (106), and a counting variable N is assigned to the integer one (108). For each $client_N$, the location of the client machine is detected (110), and an operating system image designated for the detected location is selected for $client_N$ (112). In one embodiment, the operating system images retained in the data center provides a selection of available operating system images to support the functionality of the sub-network as a whole. Following the operating system image selection, $client_N$ is subject to a re-boot (114). In one embodiment, the client machine retains the prior operating system image until the re-boot of the client machine with selected operating system image. Similarly, in one embodiment, the operating system image upload is not completed until the associated client machine re-boot has been completed. Once the re-boot is completed at step (114), the counting variable N is incremented (116), and it is determined if all of the client machines in the sub-network that require an upload of an operating system image have been processed (118). A negative response to the determination at step (118) is followed by a return to step (110). Conversely, a negative response to the determination at step (118) is followed by a conclusion of the operating system image upload(s) for the client machines in the sub-network. In one embodiment, as client machines are added to the sub-network they are evaluated for the presence of a sub-network operating system image as outlined herein. Accordingly, prior to operating within the sub-network, each client machine is provided an operating system image available for the sub-network with the operating system image selected based upon the location of the client machine within the sub-network.

Once the client machine is operating within the sub-network, there are different circumstances which may require a change of the operating system image for one or more of the client machines in the sub-network. These circumstances include, but are not limited to, an operating system update, a change in the physical location of the client machine, etc. One or more different tools may be employed to identify the location of a client machine. In one embodiment, the tool may be in the form of a radio frequency identification tag, a port on a switch, digital video surveillance, an infra-red sensor, a proximity sensor, a laser rangefinder, a geographical positioning device, etc. Similarly, in one embodiment, multiple channels of information may be employed to identify with precision the location of the client machine. Although the physical position of the client machine may change, this change may not necessarily warrant a change of the operating system image. For example, in one embodiment, the changed location of the client machine may still fall within the predetermined or pre-assigned geographical parameters designated from the prior client machine position.

Figure 2:
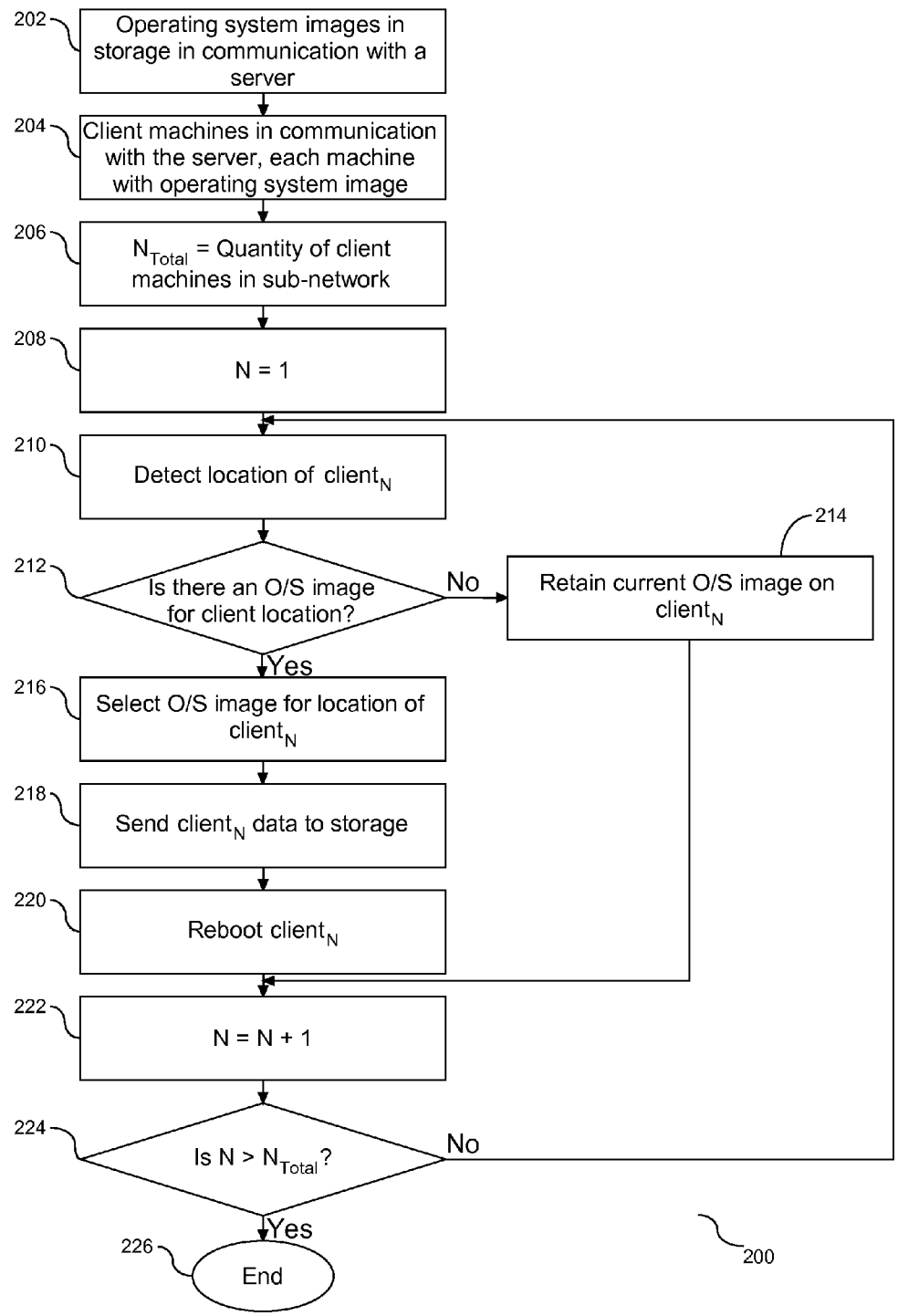
FIG. 2 is a flow diagram illustrating the components and the dynamic upload of a different operating system image with respect to a change of location of one or more client machines operating in a sub-network, and is suggested for printing on the first page of the issued patent.

FIG. 2 is a flow diagram (200) illustrating the components and the dynamic upload of a different operating system image with respect to a change of location of one or more client machines operating in a sub-network. As such, two or more operating system images are stored in data storage in communication with a server (202). In one embodiment, data storage may be in the form of a data center. Similarly, in one embodiment, the server may be in the form of a disk image server. Two or more client machines, each in communication with the disk image server, operate within the sub-network with each of the client machines having an uploaded operating system image (204). At least one of the client machines is capable of being moved from one physical location in the sub-network to a second physical location in the sub-network. In one embodiment, at least one of the client machines is a portable computing device, including but not limited to, a laptop computer, a portable digital assistant, etc. The variable $N_{Total}$ is assigned to the quantity of client machines in the sub-network (206), and a counting variable N is assigned to the integer one (208). For each $client_N$, the location of the client machine is detected (210). It is then determined if there is an operating system image designated for the location of the client machine (212). This determination includes a comparison of the currently uploaded operating system image of $client_N$ with the operating system image assigned to the current location of the client machine in the sub-network. A negative response to the determination at step (212) is following by retaining the current operating system image on $client_N$ (214). Conversely, a positive response to the determination at step (212) is followed by selecting one of the operating system images from the data storage to be uploaded to $client_N$, wherein the selection of the operating system image is based upon the location of $client_N$ (216). Following step (216), local data from $client_N$ is sent to the data storage (218) and the client machine, $client_N$, is subject to a re-boot to properly upload and enable the selected operating system image (220). Following completion of the operating system upload at step (220) or following step (214), the counting variable N is incremented (222). It is then determined if all of the client machines in the sub-network subject to evaluation for portability of the operating system image have been evaluated (224). A negative response to the determination at step (224) is followed by a return to step (210), and a positive response to the determination at step (224) concludes the evaluation process (226). It should be noted that the invention should not be limited to the process of client machine portability and operating system image evaluation as demonstrated herein. In one embodiment, the operating system image evaluation is automated to either periodically poll the client machines in the sub-network for location, or even to dynamically determine a location change of the client machine and perform the operating system selection and upload process. Regardless of the location detection process, an operating system image is determined and/or uploaded to the client machine based upon the determined physical location of the client machine. Accordingly, an operating system image for each client machine in a sub-network is evaluated to ensure proper operation of the machine based upon the physical location of the client machine within the sub-network.

Figure 3:
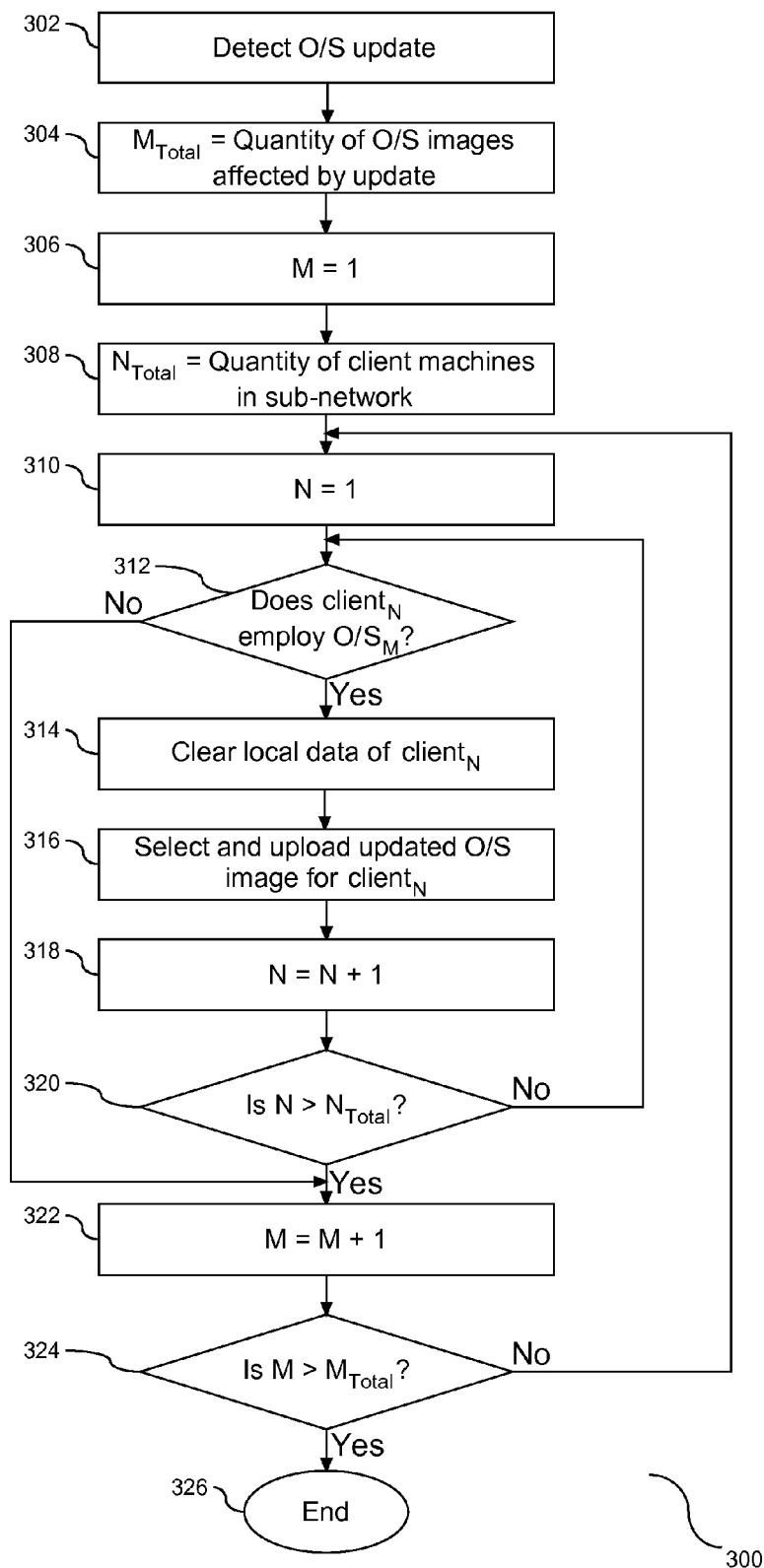
FIG. 3 is a flow chart illustrating a process for updating the operating system in each of the client machines.

Furthermore, and as noted above, the operating system image of a client machine may be subject to change based upon an operating system update. The update may be limited to one machine in the sub-network, it may include a selection of the client machines, or it may include all of the client machines. FIG. 3 is a flow chart (300) illustrating a process for updating the operating system in each of the client machines, regardless of the operating system image thereon. Initially, an operating system update for at least one of the operating system images in the data storage is detected (302). The variable $M_{Total}$ is assigned to the number of operating system images in the data storage of the sub-network that are affected by the operating system update (304). In one embodiment, the variable $M_{Total}$ may be less than all of the operating system images in the data storage of the sub-network. Similarly, in one embodiment, the variable $M_{Total}$ may include all of the operating system images in the data storage of the sub-network. A counting variable M is assigned to the integer one (306). The variable $N_{Total}$ is assigned to the number of client machines operating in the sub-network (308), and a counting variable N is assigned to the integer one (310). For each client machine in the sub-network, $client_N$, with the operating system image M, it is determined if $client_N$ employs operating system M (312). A positive response to the determination at step (312) is an indication that the operating system image of $client_N$ is subject to an update and the local data of $client_N$ is cleared (314). In one embodiment, the process of clearing local data from a client machine includes sending the local data to central or remote storage. Following the clearing of the data, an updated operating system image for $client_N$ is selected and uploaded (316). To complete the operating system update, each client machine subject to the operating system image update must be re-booted with the new operating system image. Once the upload is completed at step (316), the counting variable N is incremented (318), and it is determined if all of the client machines in the sub-network have been evaluated for the update of the operating system image M (320). A negative response to the determination at step (320) is followed by a return to step (312). Conversely, a positive response to the determination at step (320) or a negative response to the determination at step (312) is an indication that the evaluation of operating system image M is completed.

Following step (320) the counting variable M, representing the operating system image(s) affected by one or more updates, is incremented (322). It is then determined if the incremented value of M exceeds the quantity of operating system images in the sub-network that have been subject to one or more updates (324). A negative response to the determination at step (324) is followed by a return to step (310) to proceed with evaluation of the client machines in the sub-network for operating system image M. Conversely, a positive response to the determination at step (324) completes the evaluation and upload of the updated operating system images in the sub-network (326). In one embodiment, the operating system image update process is automated to clear local data and to re-boot all of the affected client machine(s)

in a simultaneous or near-simultaneous manner. Accordingly, each client machine affected by an operating system image update is subject to a re-boot to properly upload and make effective the new operating system image.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Figure 4:
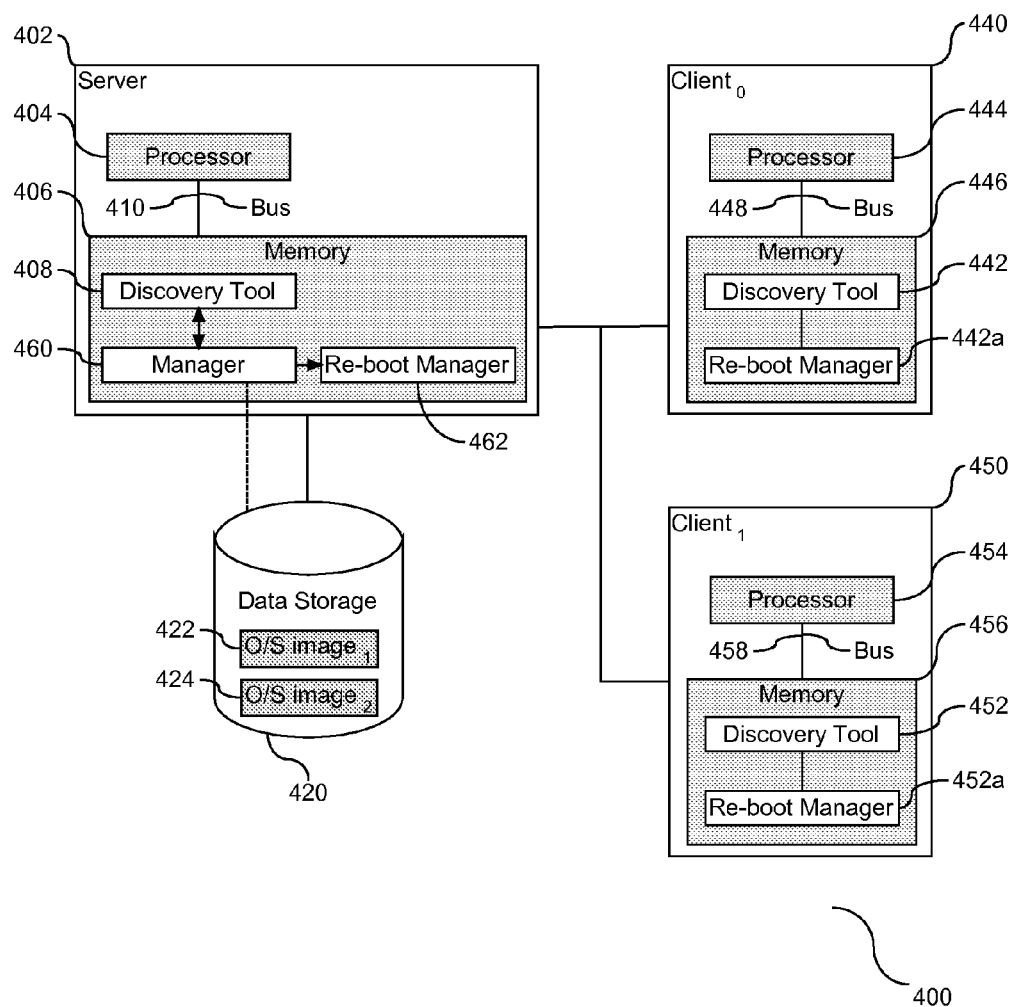
FIG. 4 is a block diagram illustrating a computer system with two or more client machines assigned to, or operating within, a sub-network, and two or operating system images assigned to the sub-network.

FIG. 4 is a block diagram (400) illustrating a computer system with two or more client machines assigned to, or operating within, a sub-network, and two or more operating system images assigned to the sub-network. The illustration shows a server (402) in communication with data storage (420). In one embodiment, the server (402) is in the form of a disk image server. The server (402) is shown with a processor unit (404) coupled to memory (406) by a bus structure (410). Although only one processor unit is shown, in one embodiment, the server (402) may include more processor units in an expanded design. As shown, the server (402) is in communication with data storage (420). In one embodiment, the data storage (420) is employed to retain at least two operating system images (422) and (424). As noted above, at least two client machines operate within the sub-network. A first client machine (440) and a second client machine (450) are shown herein with each in communication with the server (402). Although only two client machines (440) and (450) are illustrated, additional client machines may be employed in the sub-network. The first client machine (440) is shown with a processor unit (444) coupled to memory (446) by a bus structure (448). Similarly, the second client machine (450) is shown with a processor unit (454) coupled to memory (456) by a bus structure (458).

As noted above, one or more of the client machines (440) and (450) may be subject to a moved location within the sub-network. The movement in the location may affect the assignment of the operating system image (422) and (424), as the functionality of the client machine may change with respect to the movement of the client machine location. A discovery tool is provided to identify the location of each of the client machines (440) and (450) in the network. In one embodiment, the discovery tool (442) and (452) is provided local to each of the client machines (440) and (450), respectively. With this location of the discovery tool, the client machine would communication it's location to the server (402). Similarly in one embodiment, the discovery tool (408) is provided location to the server (402). With this location of the discovery tool, the server would determine the changed location of any of the client machines operating in the sub-network. In another embodiment, the discovery tool may be in the form of a tool (442) and (452) local to each of the client machines and a discovery tool (408) local to the server (402).

A manager (460) is provided local to the server (402) and in communication with the data storage (420). The manager (460) provides the functionality for the dynamic management of the operating system images (422) and (424) retained local to the data storage (420). In one embodiment, the manager (460) is in communication with the discovery tool (408). This relationship of the manager (460) to the discovery tool (408) supports the ability for the manager to dynamically and directly relate an identified physical location of each of the client machines (440) and (450) with the function thereof. More specifically, the manager (460) communicates with the data storage (420) to select and upload one of the operating system images (422) or (424) for the client machines (440) and (450) based upon the discovered physical location of the client machines (440) and (450). In one embodiment, where the discovery tool (442) and (452) is local to the client machines (440) and (450), respectively, the manager (460) is in communication with each of the discovery tools (442) and (452) to support the functionality of the operating system image selection and upload to the individual client machines.

The manager (460) communicates with the discovery tool (s) (408), (442), and/or (452) to ensure the selection and assignment of the proper operating system image(s) to the respective client machines (440) and (450) based upon the location of the client machines (440) and (450) within the sub-network. In one embodiment, upon selection of a different operating system image for either or both of the client machines (440) and (450), the manager (460) re-boots the affected client machine to enable the client machine to acquire the functionality of the selected operating system image. Similarly, in one embodiment, a re-boot manager (462) is provided in communication with the manager (460). The re-boot manager (462) is responsible for monitoring operating system image updates. More specifically, one or more of the operating system images may be subject to changes on a periodic or non-periodic basis. The re-boot manager (462) is responsible for management of these updates and for communicating with the client machines with an operating system image affected by an update. More specifically, each client machine affected by an operating system image update requires a re-boot for the upload of the updated operating system image to take affect. The re-boot manager (462) communicates with the affected client machine to ensure that local data from the client machines is sent to data storage prior to execution of the re-boot of the machine. In one embodiment, each client machine is provided with a local re-boot manager (442a) and (452a) to communicate with the re-boot manager (462) local to the server (402).

As shown herein, the discovery tool (408), the manager (460), and the re-boot manager (462) each reside in memory (406) local to the server (402). In one embodiment, the discovery tool (408), manager (460), and re-boot manager (462) may each reside as hardware tools external to memory (406), or they may be implemented as a combination of hardware and software. Similarly, in one embodiment, the discovery tool (408), manager (460), and re-boot manager (462) may be combined into a single functional item that incorporate the functionality of the separate items. Furthermore, as shown herein, each of the discovery tools (408), manager (460), and re-boot manager (462) are local to one system (400). However, in one embodiment, they may be collectively or individually distributed across a network and function as a unit to embody the functionality of individual units. Accordingly, the discovery tool (408), manager (460), and re-boot manager (462) may be implemented as software tools, hardware tools, or a combination of software and hardware tools for managing the functionality of the planner in a distributed manner.

As shown herein, in one embodiment, the client machines (440) and (450) each includes a local discovery tool (442) and (452), respectively, and local re-boot managers (442a) and (452a), respectively. In one embodiment, each of the tools (442) and (452) and each of the managers (442a) and (452a) reside in memory (446) and (456) local to the respective client machines (440) and (450). Similarly, in one embodiment, the tools (442) and (452) and managers (442a) and (452a) may each reside as hardware tools external to memory (446) and (456), respectively, or they may be implemented as a combination of hardware and software. Similarly, in one embodiment, the tools (442) and (452) and managers (442a) and (452a) may be combined into a single functional item that incorporate the functionality of the separate items. Furthermore, as shown herein, each of the tools (442) and (452) and managers (442a) and (452a) are local to one system (400). However, in one embodiment, they may be collectively or individually distributed across a network and function as a unit to embody the functionality of individual units. Accordingly, the tools (442) and (452) and managers (442a) and (452a) may be implemented as software tools, hardware tools, or a combination of software and hardware tools for managing the functionality of the planner in a distributed manner.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

The tools provided for management of a sub-network, and more specifically for dynamic portability of operating system images with respect to the client machines operating in the network. One or more managers or tools are implemented to ensure that as a client machine is moved within the sub-network, as a new client machines is introduced to the network, and/or as the operating system for the sub-network experiences an update, each of the client machines is individually managed to ensure that it is uploaded with a current and appropriate operating system image. The manager(s) and/or tool(s) function in a dynamic manner that automates the upload solely based upon the characteristics of the client machine and the operating system image, and mitigates any requirements for external contribution.

Alternative Embodiments

It will be appreciated that, although specific embodiments of the invention have been described herein for purposes of illustration, various modifications may be made without departing from the spirit and scope of the invention. In particular, in one embodiment the determination of the operating system image for one or more client machines may be based upon a virtual location of the machine within a sub-network. Accordingly, the scope of protection of this invention is limited only by the following claims and their equivalents.

We claim:
1. A computer system comprising:
   at least two client machines in communication with a disk image server;
   a selection of at least two operating system images retained in a data storage local to the disk image server;
   a discovery tool to identify a physical location of at least one of the client machines; and
   a manager in communication with the discovery tool, the manager to dynamically relate the identified location of the at least one of the client machines with the function of the client machine, including the manager to dynamically select and upload from one of the operating system images to the identified client machine based on a change in the physical location, with the operating system image selection based upon the identified physical location of the client machine.

2. The system of claim 1, further comprising each of the client machines operating in a sub-network.

3. The system of claim 1, further comprising the manager to re-boot the client machine to change from a first operating system image to a second operating system image.

4. The system of claim 3, further comprising a re-boot manager in communication with the server, the re-boot manager to re-boot the client machine in response to an operating system update.

5. The system of claim 4, further comprising the re-boot manager to send local data to the data storage prior to execution of the re-boot of the client machine.

6. The system of claim 1, further comprising the manager to employ a combination of data from at least two communication channels to identify the location of the client machine.

7. A method for managing a client machine interface, comprising:
   at least two client machines in communication with a server and data storage local to the server;
   retaining at least two operating system images in the data storage local to the server for selection;
   identifying a physical location of at least one of the client machines; and
   dynamically relating the identified location of at least one of the client machines with a function of the machine, including communicating with the server for dynamically selecting and uploading from data storage local to the server at least one of the operating system images to the identified client machine based on a change in the physical location, wherein the selected operating system image is different from a prior operating system image.

8. The method of claim 7, further comprising each of the client machines operating in a sub-network.

9. The method of claim 7, further comprising the re-booting the client machine for changing from a first operating system image to a second operating system image.

10. The method of claim 9, further comprising re-booting each of the client machines responsive to an operating system update.

11. The method of claim 10, further comprising sending local data to the data storage prior to execution of the re-boot of the client machine.

12. The method of claim 7, wherein the step of identifying the location of at least one of the client machines further comprising acquiring a combination of data from at least two communication channels.

13. An article comprising:
   at least two client machines in communication with the a server;
   a computer-readable storage medium including computer program instructions configured to manage a client machine interface, the instructions including:
      instructions to retain at least two operating system images in a data storage local to a server for selection;
      instructions to identify the physical location of at least one of the client machines; and
      instructions to dynamically relate the identified physical location of at least one of the client machines with a function of the client machine, the instructions to communicate with the server and to dynamically select and upload from data storage local to the server one of the operating system images to the identified client machine based on a change in the identified physical location.

14. The article of claim 13, further comprising instructions to complete the selection of the operating system image based upon the physical location of the client machine.

15. The article of claim 13, wherein the instructions to identify the location of at least one of the client machines includes instructions to acquire a combination of data from at least two communication channels.

16. The article of claim 13, further comprising instructions to re-boot the client machine to change from a first operating system image to a second operating system image.

17. The article of claim 13, further comprising instructions to re-boot at least one of the client machines responsive to an operating system update.

18. The article of claim 17, further comprising instructions to send local data to the data storage prior to execution of the re-boot instructions of the at least one client machine.

* * * * *